US009406093B2

(12) United States Patent
Chedeau

(10) Patent No.: US 9,406,093 B2
(45) Date of Patent: Aug. 2, 2016

(54) DETERMINING AN IMAGE LAYOUT

(71) Applicant: Facebook, Inc., Menlo Park, CA (US)

(72) Inventor: Christopher Serge Benjamin Chedeau, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 13/915,335

(22) Filed: Jun. 11, 2013

(65) Prior Publication Data

US 2014/0365905 A1 Dec. 11, 2014

(51) Int. Cl.
*G06F 3/0481* (2013.01)
*G06Q 50/00* (2012.01)

(52) U.S. Cl.
CPC .................................... *G06Q 50/01* (2013.01)

(58) Field of Classification Search
CPC ... G06F 3/04842; G06F 8/60; G06F 9/45533; G06F 9/45558; G06F 13/38; G06F 19/327; G06F 19/328; G06F 19/3418; G06F 1/1637; G06F 1/3234; G06Q 50/01
See application file for complete search history.

(56) References Cited

U.S. PATENT DOCUMENTS 6,647,533 B1 * 11/2003 Liu ......................... G06F 17/00 715/517
2004/0179103 A1 9/2004 Endo
2006/0077941 A1 4/2006 Alagappan
2008/0247667 A1 * 10/2008 Jin ........................ G06T 3/4038 382/284
2008/0256439 A1 * 10/2008 Boreham .............. G06F 17/211 715/246
2011/0157215 A1 6/2011 Aoyagi
2012/0158489 A1 * 6/2012 Benyamin et al. ......... 705/14.45
2014/0244775 A1 * 8/2014 Hull ........................ H04L 51/26 709/207

FOREIGN PATENT DOCUMENTS

KR 10-2010-0018544 A 2/2010
KR 10-2011-0019861 A 3/2011

OTHER PUBLICATIONS

International Search Report and Written Opinion for International Application PCT/US2014/041457, Sep. 30, 2014.

* cited by examiner

*Primary Examiner* — Amy Ng
*Assistant Examiner* — Tan Tran
(74) *Attorney, Agent, or Firm* — Baker Botts L.L.P.

(57) ABSTRACT

In one embodiment, a method includes accessing multiple image elements that have an ordered sequence. From the ordered sequence of image elements, multiple clusters of image elements are determined, where each cluster has one or more image elements arranged in a line. The image elements within each cluster are scaled to have substantially the same first dimension while maintaining their original aspect ratios and being arranged to maintain the ordered sequence. Each of the clusters has substantially the same second dimension. A cost for each cluster, based on a cost function, is determined. A graph based on the clusters that maintains the ordered sequence is accessed. The graph includes multiple paths that each represent a layout of the image elements and have a total cost based on the costs of the clusters along the path. The path with a lowest total cost is identified to determine a preferred layout.

33 Claims, 11 Drawing Sheets

*FIG. 6*
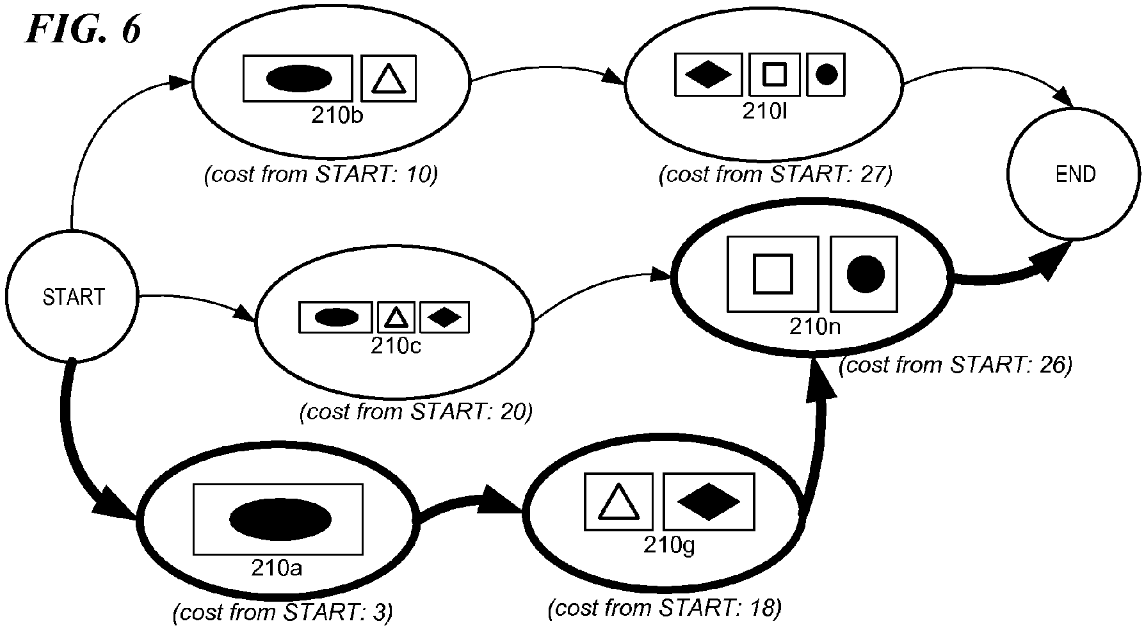
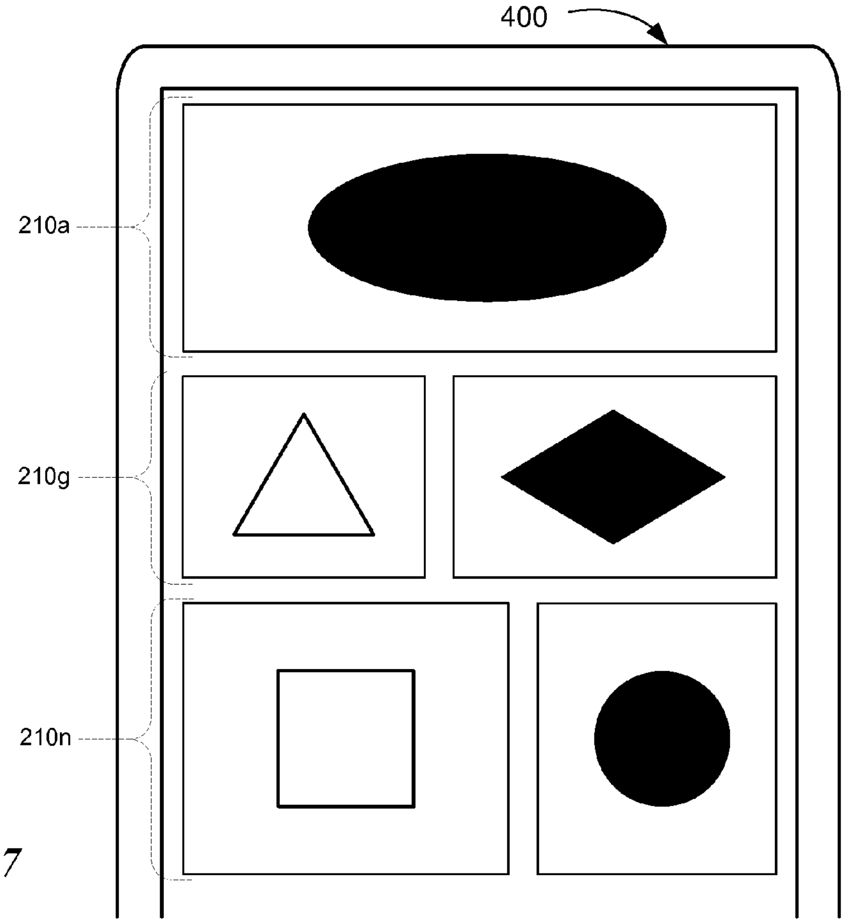
*FIG. 7*

DETERMINING AN IMAGE LAYOUT

TECHNICAL FIELD

This disclosure generally relates to image layouts.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments comprise determining a layout for an ordered sequence of image elements based on the minimization of total cost for the layout as determined by a cost function. The image elements are to be laid out according to their ordered sequence into an arrangement that may be constrained in one dimension and vary in the other dimension. Image elements may be in landscape or portrait format, with any aspect ratio. When determining a preferred layout for the image elements, the ordered sequence of image elements may be grouped into clusters by insertion of line breaks at selected positions in the sequence. Image elements in the ordered sequence may be mapped to a graph, where transitions between nodes in the graph represent candidate line break positions, and each node represents a candidate cluster of image elements. The determination of where to insert the line breaks (and thereby which images will be clustered together) may be determined by evaluating each potential cluster according to a cost function. The total cost for a particular image layout equals the sum of costs for each cluster that makes up that image layout. A preferred layout of image elements corresponds to a path through the graph that minimizes total cost. Before analyzing the graph to find a lowest-cost path, image-element clusters that do not meet certain criteria may be removed from further consideration.

BRIEF DESCRIPTION OF THE DRAWINGS

FIG. 6 illustrates the graph of FIG. 5 with the addition of an example cost for each node that represents a cost from a start node of the graph.

FIG. 7 illustrates an example display of image elements based on a lowest-cost path through the graph in FIG. 6.

DESCRIPTION OF EXAMPLE EMBODIMENTS

Particular embodiments comprise rendering a layout of image elements based on an ordered sequence of image elements. Image elements may be laid out in an arrangement where the ordered sequence of image elements is not changed from its original order. Additionally, while an image element can be scaled larger or smaller than its original size, the aspect ratio and format of each image element is preserved, and image elements are not cropped.

Figure 1:
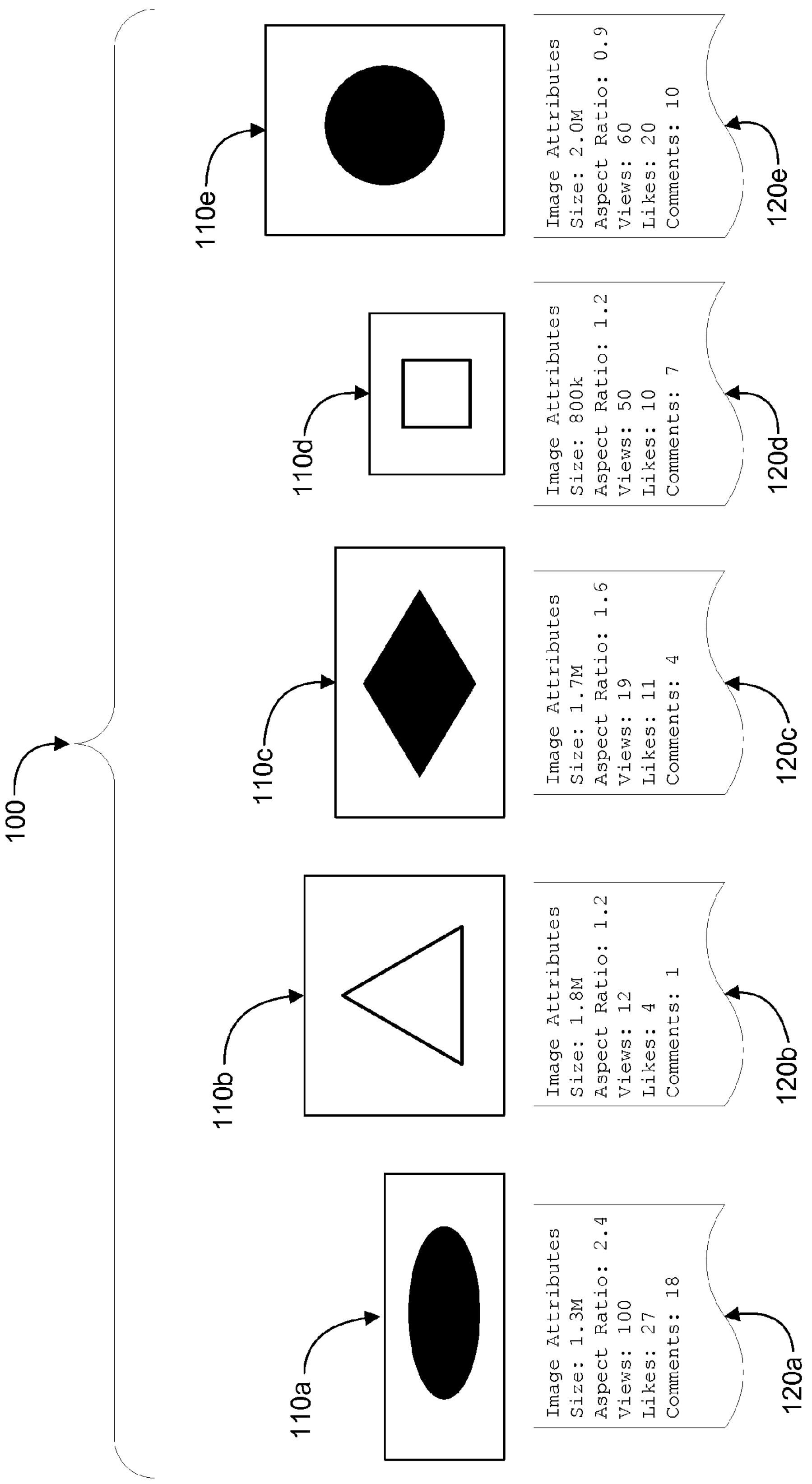
FIG. 1 illustrates an example ordered sequence of image elements.

FIG. 1 illustrates an example ordered sequence of image elements 100 consisting of five image elements 110. Associated with each image element 110 is a list of image attributes 120. Image attributes 120 may contain a variety of information about an image element 110, including but not limited to image size, image dimensions, image aspect ratio, color or tone of image, or event or location where image was taken. Image attributes 120 may also contain a variety of social-networking information related to an image element 110, including but not limited to relevance of image to the user, number of times the image has been viewed, number of times the image has received a "like" (the "like" feature is described below), number of comments the image has received, a social-networking score for the image, or an affinity coefficient (discussed below) for the image. Although this disclosure describes and illustrates particular image attributes 120, this disclosure contemplates any suitable combination of any suitable image attributes. Image elements 110 may have various sizes, formats, and aspect ratios, where aspect ratio is the ratio of the width of an image element 110 to its height. For example, image element 110*a* is in landscape format with an aspect ratio of 2.4, while image element 110*e* is in portrait format with an aspect ratio of 0.9. Although this disclosure describes and illustrates an example ordered sequence 100 having five example image elements 110, this disclosure contemplates any ordered sequence of image elements having any suitable number of image elements.

An image element 110 may include an image of any type of visual content, such as, by way of example and not limitation, a picture, a video frame, a video, a map, a text block, a page of a document, a screenshot, or any thumbnail image representation. An ordered sequence of image elements 100 may consist of any type or combination of types of image elements 110. The dimensional parameters height and width as applied to image elements 110 or clusters 210 (defined below) may be indicated in terms of an actual measure of dimension (e.g., inches or centimeters), an arbitrary measure proportional to dimension, a measure based on a number of pixels, a measure based on image element size in terms of memory (e.g., kilobytes or megabytes), a measure based on the display dimensions where image elements are to be rendered, or any other suitable measure of dimension.

The layout of image elements 110 may be constrained in one dimension and vary in the other dimension. In one example embodiment, image elements 110 may be placed sequentially into a series of rows oriented horizontally, where each row has substantially the same width, and each row is made up of one or more image elements 110 arranged in a line. In such an example embodiment, image elements 110 in a particular row all have substantially the same height, but different rows can have different heights. In another example embodiment, image elements 110 may be placed into a series of columns oriented vertically where each column has substantially the same height, and each column consists of one or more image elements 110 arranged in a line. Image elements 110 in a single column all have substantially the same width, but different columns can have different widths. Although this disclosure describes and illustrates image layouts with image elements 110 arranged horizontally in rows, this disclosure contemplates image layouts with image elements 110 arranged vertically in columns or with image elements 110 arranged in a line along any suitable orientation.

To determine a preferred layout for an ordered sequence of image elements 100, ordered sequence 100 may be grouped into candidate clusters of image elements 110 by insertion of line breaks at selected positions in ordered sequence 100. A cluster of image elements 110 is made up of one or more image elements 110 from ordered sequence 100, where the order of image elements 110 within a cluster is the same as the order within ordered sequence 100. In general, for an ordered sequence 100 having n image elements 110, there are $$\sum_{i=1}^{n} i$$

possible clusters that can be formed. So, for an ordered sequence 100 that consists of n=5 image elements 110, there are 15 possible clusters.

Figure 2:
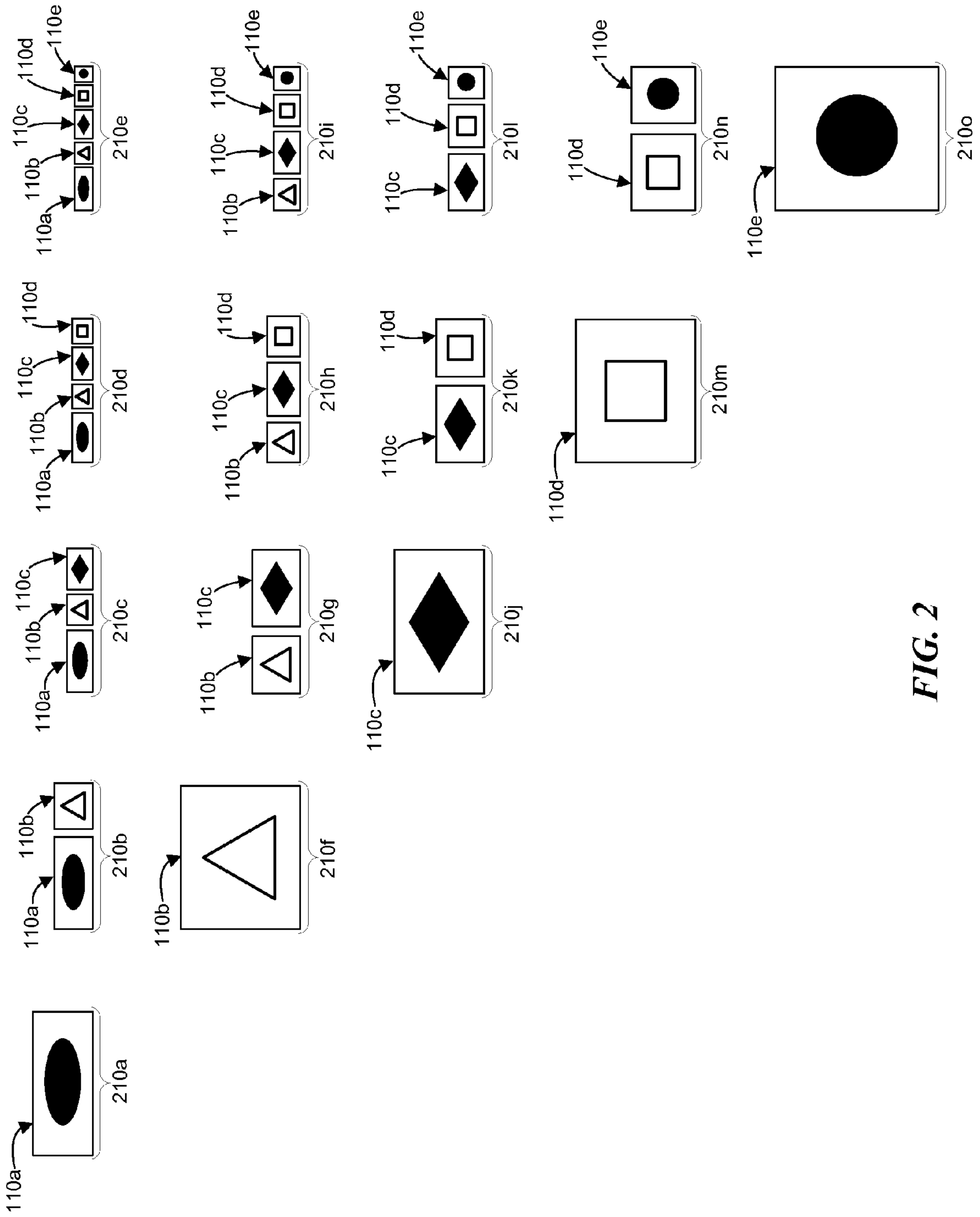
FIG. 2 illustrates example image clusters that can be formed from the ordered sequence of image elements in FIG. 1.

FIG. 2 illustrates all 15 possible example image clusters 210 that can be formed from example ordered sequence 100 of FIG. 1. In the example of FIG. 2, each candidate cluster 210 is made up of one to five image elements 110, and image elements 110 within a particular cluster 210 may be scaled so that all clusters 210 have substantially the same width. All image elements 110 within a particular cluster 210 have substantially the same height (which is also the cluster height), but the height of image elements 110 can vary for different clusters 210. For example, cluster 210*o* consists of a single image element 110*e*, where image element 110*e* has been scaled to have the width of one cluster 210. In contrast, in cluster 210*e* image element 110*e* is one of five image elements 110, and image element 110*e* is scaled down considerably compared with its size in cluster 210*o*. While image elements 110 may be scaled from their original size to fit into a particular cluster 210, in the example of FIG. 2, the aspect ratio and format of each image element 110 is preserved, and image elements 110 are not cropped. Within each cluster 210, the order of image elements 110 is the same as in ordered sequence 100 of FIG. 1. For example, cluster 210*h* consists of, in order, image elements 110*b*, 110*c*, and 110*d*. Cluster 210*h* corresponds to a line break between image elements 110*a* and 110*b* and another line break between image elements 110*d* and 110*e*.

Figure 3:
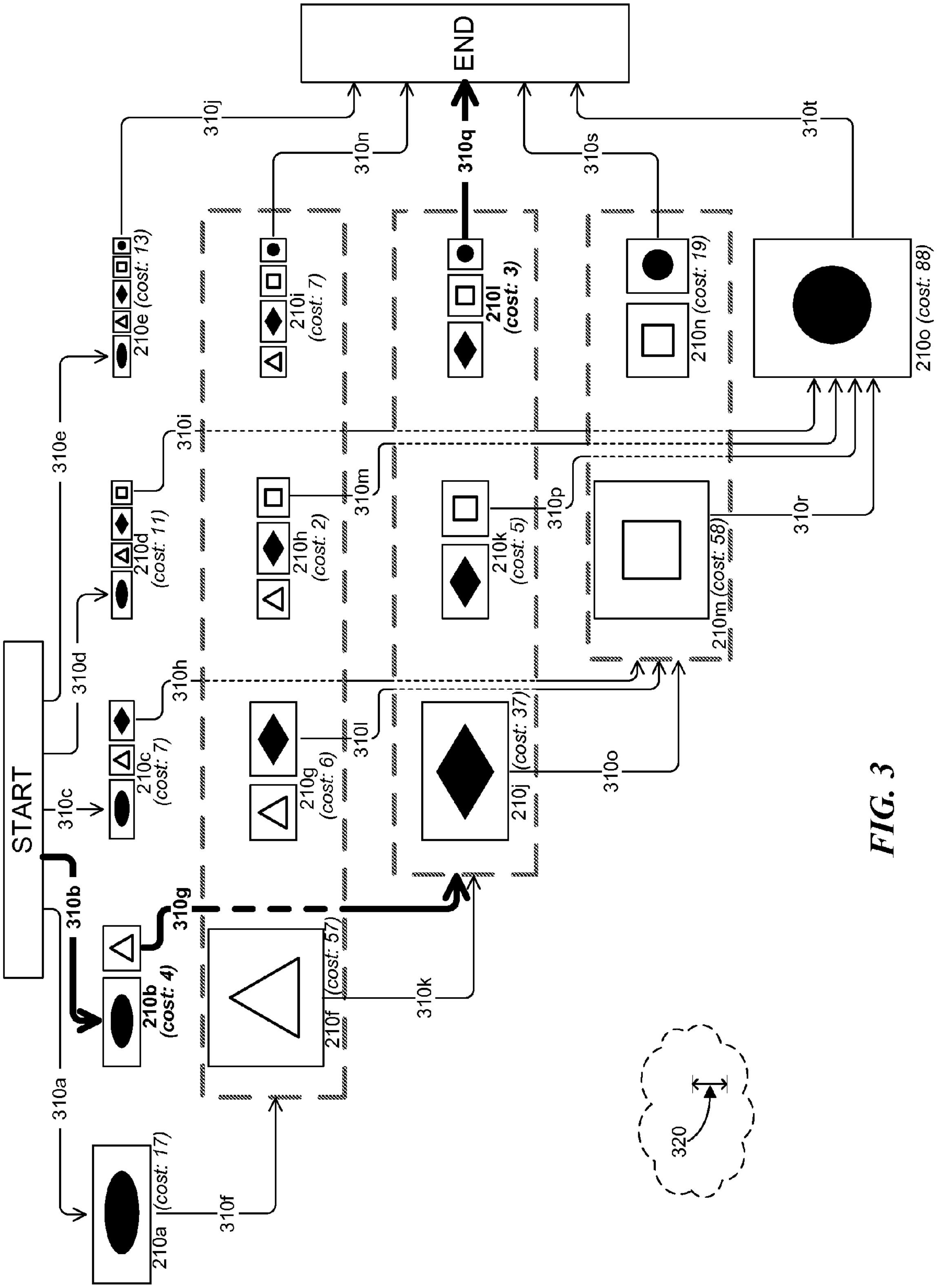
FIG. 3 illustrates the image clusters from FIG. 2 arranged in an example graph.

FIG. 3 illustrates an example rendering algorithm to determine a preferred layout for an ordered sequence of image elements 100 based on a cost function. While FIG. 3 illustrates an example ordered sequence 100 having five image elements 110, the rendering algorithm described here can be generalized and applied to any ordered sequence having any number of image elements. The example rendering algorithm illustrated in FIG. 3 begins by assigning a cost to each candidate cluster 210 from FIG. 2 according to a cost function. Any conventional cost function may be utilized.

In the example of FIG. 3, the cost function is based on an example target height 320, where the greater the difference between cluster height and target height 320, the greater the cluster cost. Thus, the cost function penalizes clusters more (by assigning higher costs) the more they differ from target height 320. In this example, the cost function for a particular cluster 210 identified by an index m and having a cluster height ClusterHeight(m) can be expressed as ClusterCost(m)=abs[ClusterHeight(m)−TargetHeight], where "abs" gives the absolute value of the expression in brackets and TargetHeight is target height 320. Thus, a cluster 210 having a height the same as target height 320 has a cost equal to zero. The larger the difference between the height of a cluster 210 and target height 320, the larger the cost for that particular cluster 210. In the example of FIG. 3, ClusterCost(210*e*)=13, and ClusterCost(210*o*)=88. In the example of FIG. 3, clusters 210*h*, 210*l*, and 210*b* have relatively low costs of 2, 3, and 4, respectively, indicating that clusters 210*h*, 210*l*, and 210*b* are close to target height 320. In contrast, clusters 210*f*, 210*m*, and 210*o* exceed target height 320 and thus have relatively high costs of 57, 58, and 88, respectively. Similarly, clusters 210*d* and 210*e* are below target height 320 and also have relatively high costs of 11 and 13, respectively. Thus, for example, a rendering algorithm that identifies a preferred layout based on a target cluster height may tend to favor clusters 210*h*, 210*l*, and 210*b* and tend to not favor clusters 210*f*, 210*m*, 210*o*, 210*d*, and 210*e*. Target height 320 is a fixed parameter that can be selected in a variety of ways, including but not limited to consideration of one or more of the following factors: preferences of the user; one or more attributes 120 of image elements 110 that make up ordered sequence 100; or the dimensions or resolution of the display screen where image elements 110 are to be rendered. Although this disclosure describes and illustrates a particular example target height 320, this disclosure contemplates any suitable target height 320 and any suitable method for selecting a particular target height 320.

As shown in the example of FIG. 3, a graph may be constructed such that candidate clusters 210 may be linked according to the various ways image elements 110 can be laid out. Each node (or vertex) of the graph may represent a cluster 210 with an associated cost, and transitions 310 (or edges) between nodes may represent line breaks between clusters 210. The graph may be a directed acyclic graph, where each transition 310 (edge) has a direction indicated by an arrow, and it is not possible to follow a path that loops back on itself. The total cost associated with a particular layout of image elements 110 may be defined as the sum of cluster costs obtained when traversing a path on the graph from start to end that corresponds to that particular layout of image elements 110. For example, one possible path travels from the start to cluster 210*b* (cost: 4) along transition 310*b*, then to cluster 210*j* (cost: 37) along transition 310*g*, then to cluster 210*n* (cost: 19) along transition 310*o*, and finally to the end along transition 310*s*. This path corresponds to a layout made up of clusters 210*b*, 210*j*, and 210*n*, and the total cost associated with this layout is 60 (=4+37+19).

For a given cost function, a path that traverses the graph from start to end with a minimum total cost corresponds to a preferred layout of image elements 110. For the example of FIG. 3, the lowest-cost path through the graph, made up of transitions 310*b*, 310*g*, and 310*q* (indicated by bold lines), travels to clusters 210*b* and 210*l* and has a total cost of 7. In an example situation where a graph may have two or more paths each having the same lowest cost, the rendering algorithm to determine a preferred layout may arbitrarily choose any one of the lowest-cost paths, or the rendering algorithm may apply any suitable criteria to select one of the lowest-cost paths.

Figure 4:
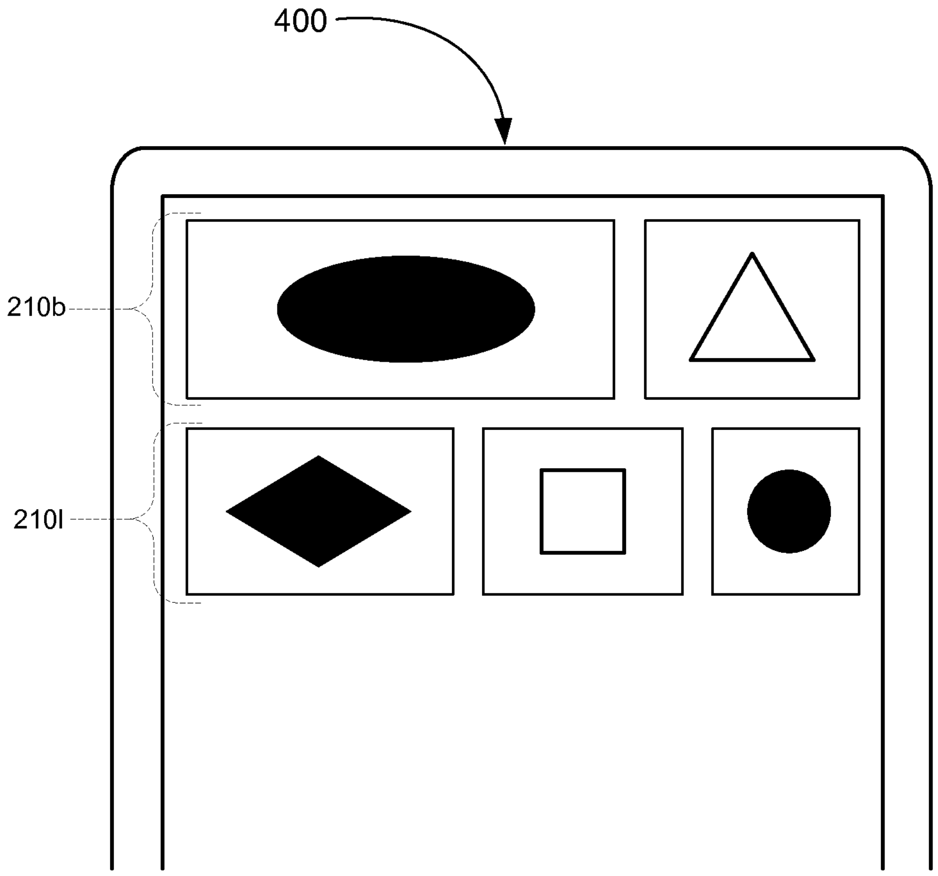
FIG. 4 illustrates an example display of image elements based on a lowest-cost path through the graph in FIG. 3.

FIG. 4 illustrates an example layout of image elements 110 rendered on an example display 400, where the layout corresponds to the lowest-cost path through the graph in FIG. 3. The example preferred layout shown in FIG. 4 is made up of clusters 210*b* and 210*l*, and the preferred layout represents the minimum total cost according to the example target-height cost function as defined above. While image elements 110 may have been resized from their original sizes, the aspect ratio of each image element 110 has been preserved, and image elements 110 have not been cropped. The order of image elements 110 in the layout is the same as the order of image elements 110 in ordered sequence 100 of FIG. 1. Clusters 210*b* and 210*l* have the same width. Image elements 110 within a particular cluster (e.g., image elements 110*c*, 110*d*, and 110*e* in cluster 210*l*) have the same height, but clusters 210*b* and 210*l* have different heights. Note that another cost function, different from the target-height cost function defined above, may produce a different lowest-cost path through the graph and thus, a different preferred layout of image elements 110.

In the examples of FIGS. 2 and 3, each cluster 210 with more than one image element 110 is shown having a gap between adjacent image elements 110. This disclosure contemplates clusters 210 having no gap or gaps of any suitable size between adjacent image elements 110. In the example layout of FIG. 4, there are gaps between adjacent image elements 110 as well as a gap between clusters 210*b* and 210*l*. This disclosure contemplates layouts having no gap or gaps of any suitable size between adjacent image elements 110 and between adjacent clusters 210.

Example pseudo-code is presented below for example embodiments of three example cost functions. Before applying the cost function, image elements 110 in a cluster 210 are scaled so that all image elements 110 have the same height and so that the width of cluster 210 matches the desired row width. One example cost function, discussed above, is based on an example target height 320, and example pseudo-code for that cost function is presented below:

```
function cluster.cost.1(cluster,n) //cluster contains n images
return Math.abs(TARGET_HEIGHT − cluster.height)
```

Another example target-height cost function can be defined as the square of the difference between cluster height and target height 320. For this example cost function, as the difference between cluster height and target height 320 increases, cluster cost increases quadratically, rather than linearly as with the target-height cost function defined previously. Pseudo-code for an example quadratic target-height cost function is presented below:

```
function cluster.cost.2(cluster,n)
return Math.power(TARGET_HEIGHT − cluster.height, 2)
```

A third example cost function that assigns cost based on the difference between the area of each image element 110 in cluster 210 and a target area is presented below:

```
function cluster.cost.3(cluster,n)
diff = 0
for i = 1 to n
    area = cluster[i].height * cluster[i].width    //area of the i-th image
    in cluster
    diff += Math.abs(TARGET_AREA − area)
next n
return diff
```

The target-height and target-area cost functions described above are just some examples of many possible cost functions that can be used to achieve an image layout with clusters 210 having heights close to a target height 320 or target area. Moreover, in particular embodiments, many cost functions may be defined that consider any number of factors, including but not limited to one or more of the following: a target cluster height; a minimum cluster height; a maximum cluster height; a target area for each image element; a minimum number of image elements per cluster (e.g., each cluster must have at least two image elements); a maximum number of image elements per cluster (e.g., no more than four image elements per cluster); preservation of aspect ratio; image format (landscape or portrait); color or tone of image elements in a cluster; the dimensions and resolution of the display screen where image elements are to be rendered; preferences of the viewing user; social-networking information related to image elements; social-networking information of the user associated with image elements; or social-networking information of the user whom the image elements are to be displayed to. Although this disclosure describes and illustrates particular example cost functions, this disclosure contemplates any suitable cost function that may be related to one or more of the factors listed above or to any other suitable factors.

Figure 5:
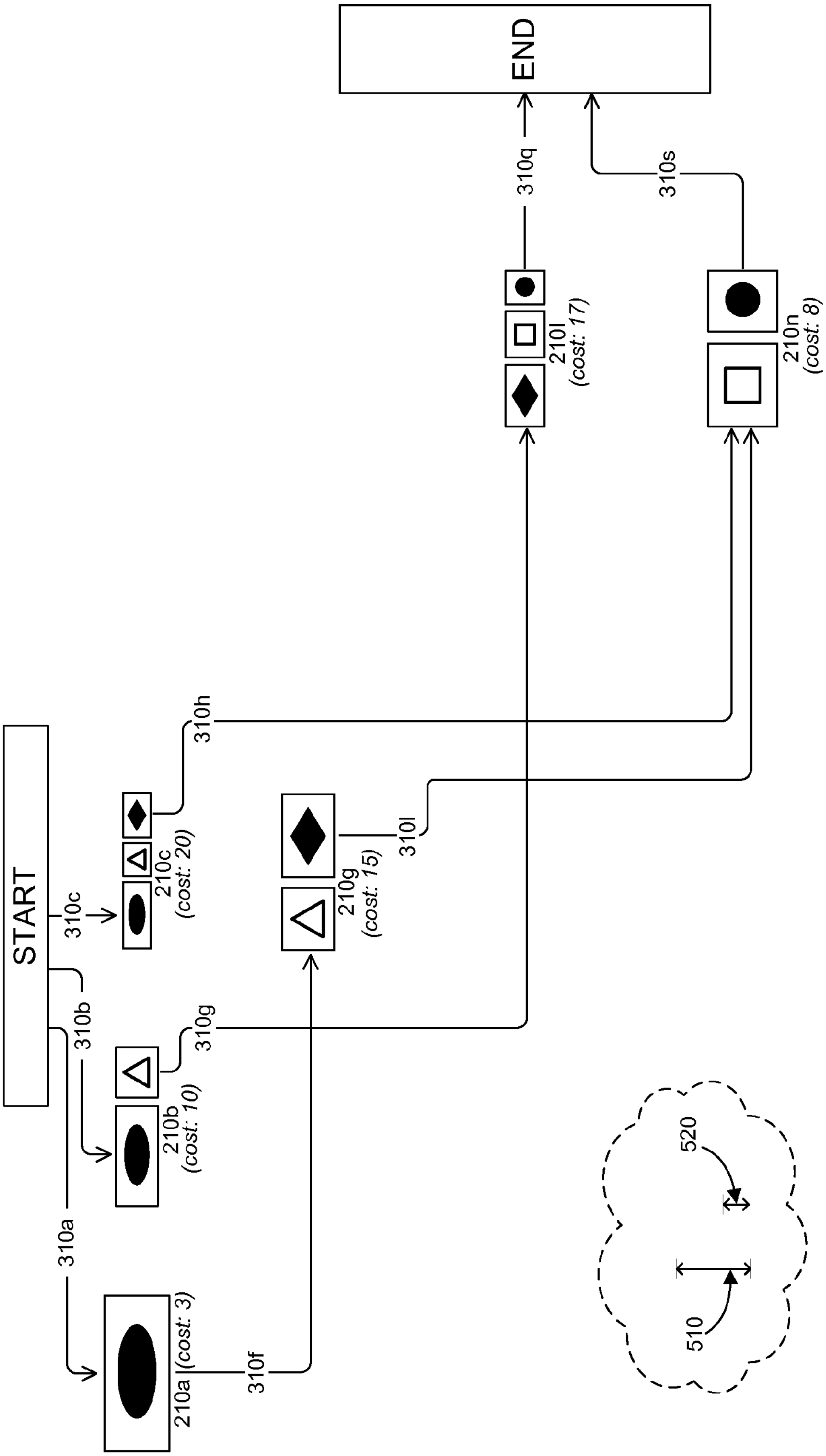
FIG. 5 illustrates the graph of FIG. 3 with particular image-element clusters removed from consideration.

FIG. 5 illustrates the graph of FIG. 3 with some image-element clusters 210 removed from consideration. Prior to calculating a cost for each cluster 210 and constructing a graph, some clusters 210 that do not meet certain criteria may be removed from further consideration. Removing a cluster 210 from consideration means that cluster 210 may not be available as a node on the graph. This process of evaluating and removing certain clusters 210 from consideration may simplify the graph and the process of finding the lowest-cost path that traverses the graph. In the example of FIG. 5, clusters 210 with heights above a maximum height threshold 510 (i.e., clusters 210*f*, 210*j*, 210*m*, and 210*o*) and below a minimum height threshold 520 (i.e., clusters 210*d*, 210*e*, and 210*i*) have been removed from consideration. By disallowing some clusters 210, certain other clusters 210 are now unreachable from the start or are along paths that do not connect to the end (i.e., 210*h* and 210*k*), and these clusters 210 can also be removed from the graph. Although this disclosure describes and illustrates particular criteria for removing clusters 210 from consideration, this disclosure contemplates any suitable criteria for removing clusters from consideration.

In the example graph of FIG. 5, a new example cost function, different from that described above, has been applied to clusters 210. The cost function depends on a social-networking score for each image element 110, where the social-networking score may be calculated using image attributes

120 related to social networking, such as for example one or more of the following: relevance of image to the user, number of times the image has been viewed, number of times the image has received a "like," number of comments the image has received, or an affinity coefficient (discussed below) for the image. Lower costs indicate a higher social-networking score, so that a cluster 210 with a lower cost may have image elements 110 with a higher number of views, likes, or comments. In the example graph of FIG. 5, cluster 210*a* has a cost of 3, indicating a relatively high social-networking score for image element 110*a*, while cluster 210*c* has a cost of 20, indicating a relatively low social-networking score for the combination of image elements 110*a*, 110*b*, and 110*c*. Thus, although image element 110*a* may have a relatively high social-networking score, the combined social-networking score for image elements 110*a*, 110*b*, and 110*c* may be relatively low due to the relatively low social-networking score for image elements 110*b* and 110*c*. Although this disclosure describes and illustrates a particular social-networking-based cost function, this disclosure contemplates any suitable social-networking cost function that may be related to any suitable social-networking factors.

FIG. 6 illustrates the example graph of FIG. 5 redrawn in a different example format but with the same vertices and edges and with the addition of a cost at each node that represents the cost to travel from the start to that particular node. The path through the graph with the lowest total cost is highlighted in bold and travels from the start to cluster 210*a*, then to cluster 210*g*, then to cluster 210*n*, and then finishes at the end. The total cost to traverse the graph along that path is 26, which is the sum of the costs of clusters 210*a*, 210*g*, and 210*n*. There are two other paths through the graph that each have higher costs. One of these higher-cost paths travels to clusters 210*b* and 210*l* (total cost 27), and the other travels to clusters 210*c* and 210*n* (total cost 28).

FIG. 7 illustrates an example layout of image elements 110 rendered on an example display 400, where the layout corresponds to a lowest-cost path through the graph in FIG. 6. The example preferred layout shown in FIG. 7 is made up of clusters 210*a*, 210*g*, and 210*n*, and the preferred layout represents a minimum total cost according to a social-networking cost function as discussed above. While image elements 110 may have been resized from their original sizes, the aspect ratio of each image element 110 has been preserved, and image elements 110 have not been cropped. The order of image elements 110 in the layout is the same as the order of image elements 110 in ordered sequence 100 of FIG. 1. Clusters 210*a*, 210*g*, and 210*n* have the same width. Image elements 110 within a particular cluster (e.g., image elements 110*b* and 110*c* in cluster 210*g*) have the same height, but each cluster may have a different height. Note that the example social-networking cost function applied to image elements 110 results in the example preferred layout of FIG. 7, while the example target-height cost function discussed above results in a different example preferred layout of FIG. 4. Thus, a preferred layout that is identified by a rendering algorithm may depend on the particular cost function that is selected.

Figure 8:
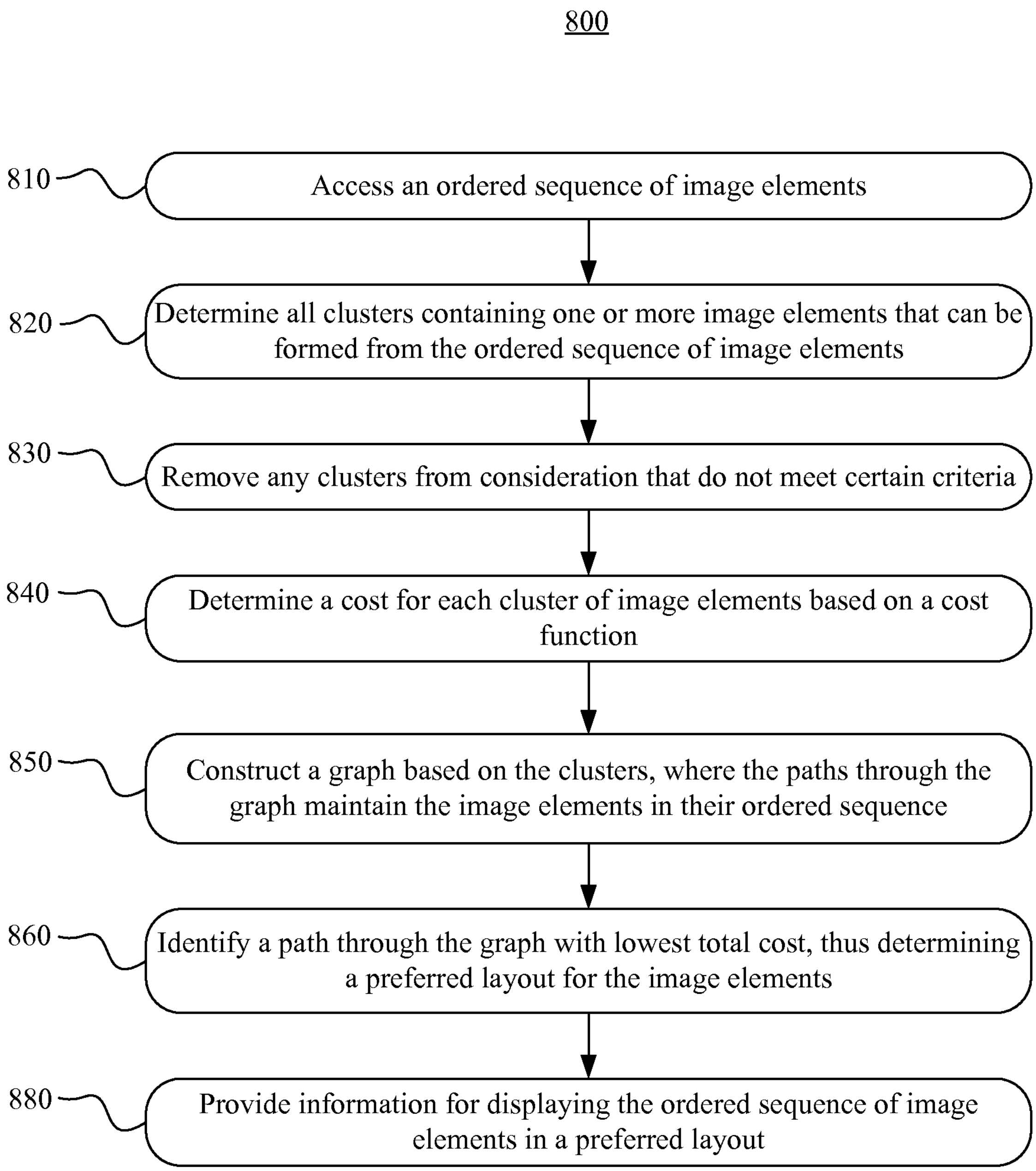
FIG. 8 illustrates an example method for determining a preferred layout of an ordered sequence of image elements.

FIG. 8 illustrates an example method for determining a preferred layout of an ordered sequence 100 made up of image elements 110. The method may begin at step 810, where an ordered sequence of image elements 100 may be accessed. In step 820, clusters 210 containing one or more image elements 110 that can be formed from ordered sequence 100 may be determined. Image elements 110 within each cluster 210 may preserve the same order as image elements 110 in ordered sequence 100. Image elements 110 within each cluster 210 may be scaled so that clusters 210 have substantially the same width, image elements 110 within any cluster 210 have substantially the same height, and image elements 110 maintain their original aspect ratio. Each cluster 210 contains image elements 110 having substantially the same height, but image elements 110 in different clusters 210 may have different heights. In step 830, any clusters 210 that do not meet certain criteria may be removed from consideration. For example, clusters 210 that are too tall, too short, contain too many image elements, or contain too few image elements may be removed from consideration. This disclosure contemplates any suitable criteria for evaluating and removing certain clusters 210 from consideration. In step 840, a cost for each cluster 210 may be determined based on a cost function. In step 850, a graph may be constructed, where each node (or vertex) of the graph may represent a cluster 210, and transitions 310 (or edges) between nodes may represent line breaks between clusters 210. Transitions 310 between nodes may preserve the original order of ordered sequence 100. The graph may consist of a number of paths that traverse the graph from start to end, where each path represents a possible layout of image elements 110, and each path has a total cost based on the costs of clusters 210 along the path.

In step 860, a path that traverses the graph from the start to the end and has a lowest total cost may be identified. This lowest-cost path corresponds to a preferred layout of ordered sequence 100 based on a cost function. An example of step 860 is described and illustrated in more detail below and in FIG. 9 (and in steps 862-876). In step 880, the information for displaying ordered sequence 100 in a preferred layout may be provided to a user or a client system, at which point the method may end. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for determining a preferred layout of an ordered sequence 100 made up of image elements 110 including the particular steps of the method of FIG. 8, this disclosure contemplates any suitable method for determining a preferred layout of an ordered sequence 100 made up of image elements including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8. As an example, the method of FIG. 8 may be carried out by a client computing device (such as a smartphone), a server computing device (such as a server computing device of a social-networking system that is providing to the client computing device a structured document including ordered sequence 100 made up of image elements 110), or a combination of the two, where appropriate.

Figure 9:
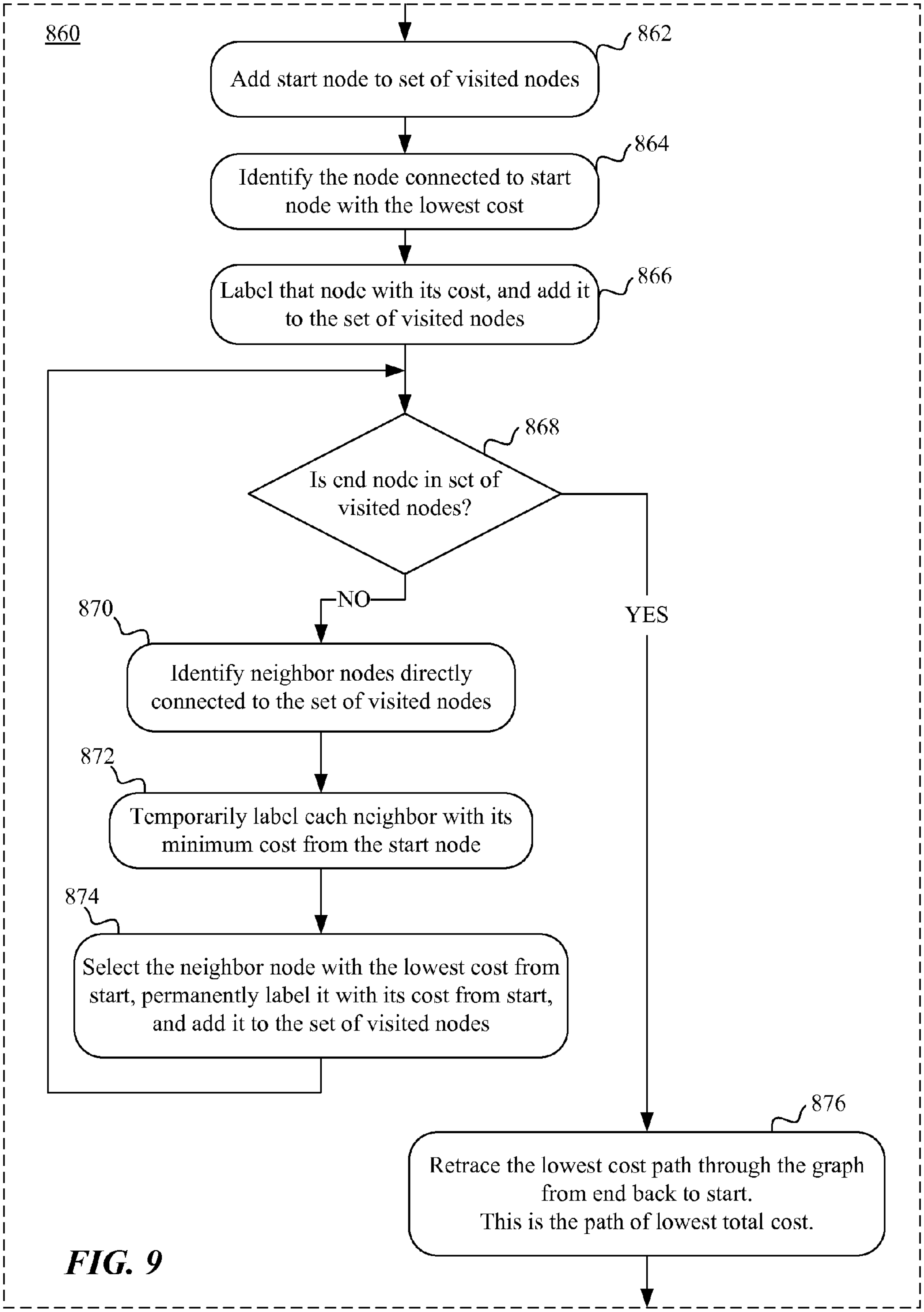
FIG. 9 illustrates an example method for finding a lowest-cost path through a graph.

There are numerous algorithms for identifying a lowest-cost path that traverses a graph from a start node to an end node. Examples of some algorithms include but are not limited to Djikstra's algorithm, Bellman-Ford algorithm, A* (pronounced "A star") algorithm, and Floyd-Warshall algorithm. FIG. 9 illustrates details of an example method (corresponding to step 860 in FIG. 8) for identifying a path that traverses a graph from start to end and has a lowest total cost. The example method illustrated in FIG. 9 is based on Djikstra's algorithm. Although this disclosure describes and illustrates a particular algorithm for finding a lowest-cost path that traverses a graph, this disclosure contemplates any suitable algorithm for finding a lowest-cost path. An example method, based on Djikstra's algorithm, for identifying a lowest-cost path that traverses a graph may begin at step 862, where the start node may be added to a set that contains all nodes that have been visited. In step 864, a node connected to the start node and having a lowest cost may be identified. In step 866, the lowest-cost node identified in step 864 may be labeled with its cost and added to the set of visited nodes. At this point, the set of visited nodes may contain the start node and the one node identified in step 864.

In step 868, the set of visited nodes may be assessed to determine whether it contains the end node. If not, the method proceeds to step 870, where neighbor nodes that are directly connected (i.e., connected by a single transition 310) to a node in the set of visited nodes may be identified. In step 872, each neighbor node may be temporarily labeled with its minimum cost from the start node. In step 874, a neighbor node with a lowest cost from the start node may be permanently labeled with its cost from the start node and added to the set of visited nodes. The method may then return to step 868 to assess whether the set of visited nodes contains the end node. If not, the method may continue exploring the graph in steps 870, 872, and 874. In step 868, if the set of visited nodes contains the end node, the method proceeds to step 876, where the lowest-cost path through the graph may be identified by retracing the lowest-cost path from the end back to the start. At this point the example method for identifying a lowest-cost path that traverses a graph may end.

In particular embodiments, accessing ordered sequence 100 or image elements 110 may comprise retrieving or requesting ordered sequence 100 or image elements 110 from one or more local data stores, from one or more remote data stores, from one or more databases, from one or more third-party servers, or by accessing one or more application programming interfaces (APIs). In particular embodiments, retrieval of ordered sequence 100 or image elements 110 may comprise generating screenshots, generating thumbnails, extracting video frames, cropping images, scaling images, converting images from one format to another (e.g., vector to raster, or Portable Networking Graphics (PNG) to Joint Photographic Experts Group (JPEG)).

The set of image elements 110 in ordered sequence 100 may include image elements 110 from a social-networking system. Such image elements 110 may include image elements 110 associated with the viewer, image elements 110 associated with other users connected to the viewer in a social graph (which may be limited to users connected to the viewer within a particular degree of separation, users within a particular group or organization, users sharing particular interests or affinities with the viewer, or users having a similar profile as the user or a target demographic profile) or image elements 110 associated with particular users or concepts that the viewer is following. Example embodiments of a social-networking system are described in further detail with respect to FIG. 10. Example embodiments of a social graph are described in further detail with respect to FIG. 11.

The set of image elements 110 in ordered sequence 100 may include a set of captured image elements 110 of online content. In particular embodiments, an image element 110 may represent a screenshot of a website, a portion of a website, or a screenshot of some other type of online content. For example, image elements 110 may include screenshots of current news stories for topics, companies, politicians, or celebrities that the user is following. Upon clicking on image element 110, the viewer may be taken to the website for the screenshot. Such captured image elements 110 may be generated by a web crawler or received from third-party servers.

A social-networking score may be assigned to image elements 110 according to relevance to the user, user preferences, or other factors. In particular embodiments, image elements 110 may have social-networking scores assigned in accordance with social-networking information. A social-networking system may have determined a relevance score for an image element 110 based at least in part on a connection value for image element 110. As an example and not by way of limitation, a number of people depicted in image element 110 who are associated with user nodes connected to the viewer in the social graph may affect the connection value. As an example and not by way of limitation, a degree of separation between user nodes of the social graph and the viewer may affect the connection value. As another example, the type of connection between the viewer and the user nodes of the social graph user may affect the connection value. As an example and not by way of limitation, "friendship"-type connections may be associated with a higher connection value than a "work colleague"-type connection.

A social-networking system may determine a relevance score for an image element 110 based at least in part on an interest value for image element 110. The interest value may be based at least in part on whether a category or categories assigned to image element 110 coincide with the category or categories associated with the viewer's interests. The interest value may be based at least in part on whether a category or categories assigned to people, locations, objects, or actions depicted in image element 110 coincide with the category or categories associated with the viewer's interests. The interest value may be based at least in part on whether a category or categories assigned to social-networking information, third-party information, or metadata associated with image element 110 coincide with the category or categories associated with the viewer's interests.

As an example and not by way of limitation, an object in the social graph may include a user or concept profile, or information associated with a user node that is connected to the user. As another example, an action may include friending/unfriending a user node, "liking" a content object, becoming a fan of a third party, joining a group or community of users on social-networking system 1060, or visiting a website of a third party. As another example, third-party information may include information of activity of the user or purchases by the user on a third-party website.

Determination of relevance scores is discussed in further detail in U.S. patent application Ser. No. 12/976,859, filed 22 Dec. 2010 and titled "Timing for Providing Relevant Notifications for a User Based on User Interaction with Notifications," which is incorporated herein by reference.

The relevance score may be based at least in part to an affinity for the user with respect to the object of the social graph, as described below. As an example and not by way of limitation, affinity for past, present, or future content may be determined by the processing module of the content engine based on user activities, activities of the user nodes of the social graph, or associated connections, or any combination thereof. Affinity may be calculated using a weighted set of predictor functions. Predictor functions predict whether the user will perform a particular action. The predictor functions may predict any number of actions, which may be within or outside of the social networking system. Any type of variable may be considered when determining affinity to weight the aggregated consolidated data. Determination and use of measures of affinity are discussed in further detail in the following U.S. patent applications, all of which are incorporated herein by reference: U.S. patent application Ser. No. 11/502,757, filed on 11 Aug. 2006, titled "Generating a Feed of Stories Personalized for Members of a Social Network," and issued as U.S. Pat. No. 7,827,208; U.S. patent application Ser. No. 12/645,481, filed on 23 Dec. 2009 and titled "Selection and Presentation of Related Social Networking System Content and Advertisements;" U.S. patent application Ser. No. 13/247,825, filed on 28 Sep. 2011 and titled "Instantaneous Recommendation of Social Interactions in a Social Networking System;" U.S. patent application Ser. No. 12/976,755, filed on 22 Dec. 2010 and titled "Pricing Relevant Notifications Provided to a User Based on Location and Social Information;" U.S. patent application Ser. No. 12/978,265, filed on 23 Dec. 2010 and titled "Contextually Relevant Affinity Prediction in a Social Networking System;" and U.S. patent application Ser. No. 13/632,869, filed on 1 Oct. 2012 and titled "Mobile Device-Related Measures of Affinity."

Figure 10:
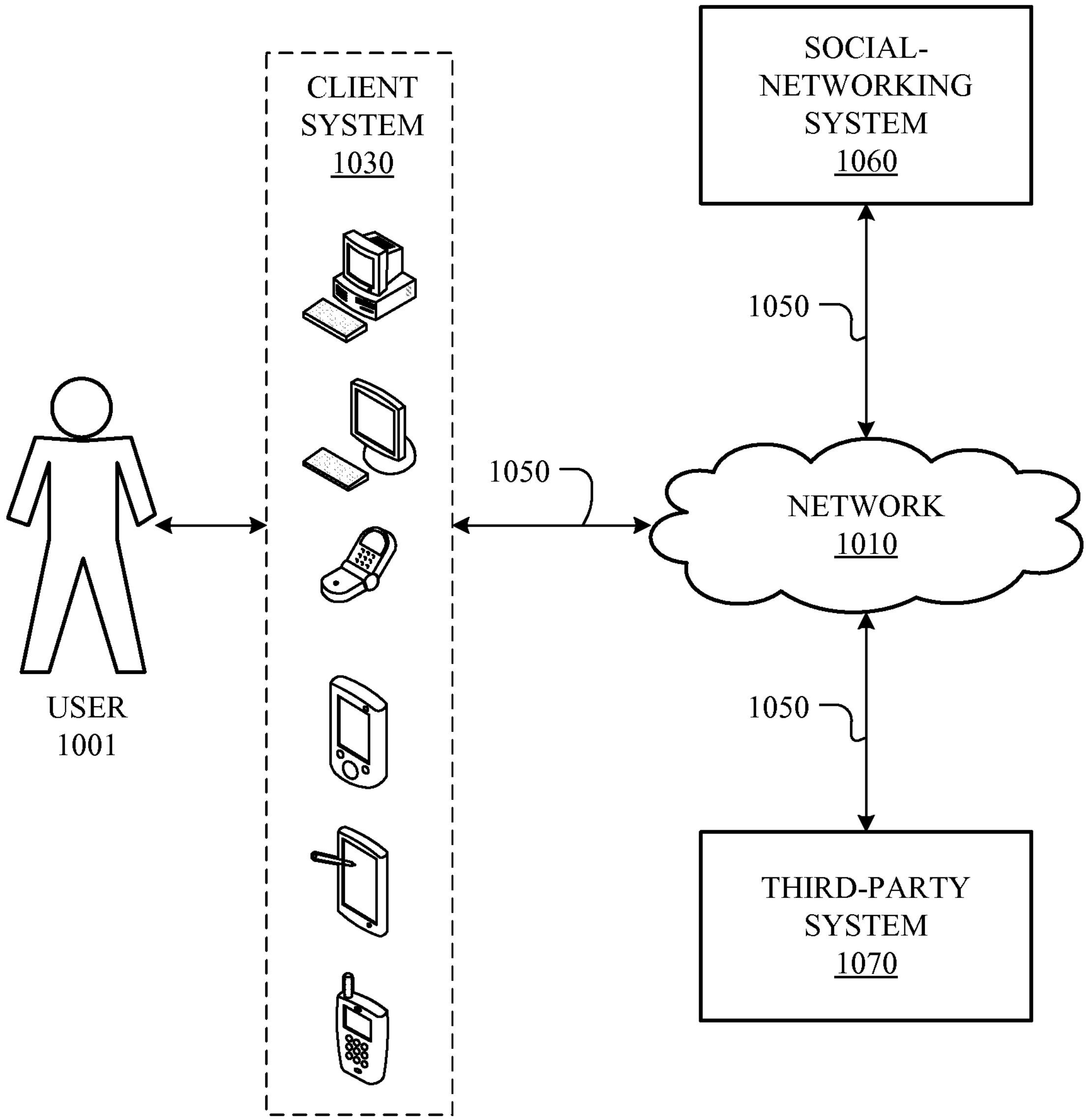
FIG. 10 illustrates an example network environment associated with a social-networking system.

FIG. 10 illustrates an example network environment 1000 associated with a social-networking system. Network environment 1000 includes a user 1001, a client system 1030, a social-networking system 1060, and a third-party system 1070 connected to each other by a network 1010. Although FIG. 10 illustrates a particular arrangement of user 1001, client system 1030, social-networking system 1060, third-party system 1070, and network 1010, this disclosure contemplates any suitable arrangement of user 1001, client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. Moreover, although FIG. 10 illustrates a particular number of users 1001, client systems 1030, social-networking systems 1060, third-party systems 1070, and networks 1010, this disclosure contemplates any suitable number of users 1001, client systems 1030, social-networking systems 1060, third-party systems 1070, and networks 1010. As an example and not by way of limitation, network environment 1000 may include multiple users 1001, client system 1030, social-networking systems 1060, third-party systems 1070, and networks 1010.

In particular embodiments, user 1001 may be an individual (human user), an entity (e.g., an enterprise, business, or third-party application), or a group (e.g., of individuals or entities) that interacts or communicates with or over social-networking system 1060. In particular embodiments, social-networking system 1060 may be a network-addressable computing system hosting an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. In particular embodiments, social-networking system 1060 may include an authorization server (or other suitable component(s)) that allows users 1001 to opt in to or opt out of having their actions logged by social-networking system 1060 or shared with other systems (e.g., third-party systems 1070), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 1070 may be a network-addressable computing system that can host content servers. Third-party system 1070 may generate, store, receive, and send content, including multimedia content, such as, for example, images, video, text, websites, interactive content, live streaming content, etc. Third-party system 1070 may be accessed by the other components of network environment 1000 either directly or via network 1010. In particular embodiments, one or more users 1001 may use one or more client systems 1030 to access, send data to, and receive data from social-networking system 1060 or third-party system 1070. Client system 1030 may access social-networking system 1060 or third-party system 1070 directly, via network 1010, or via a third-party system. As an example and not by way of limitation, client system 1030 may access third-party system 1070 via social-networking system 1060. Client system 1030 may be any suitable computing device, such as, for example, a personal computer, a laptop computer, a cellular telephone, a smartphone, or a tablet computer.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

Figure 11:
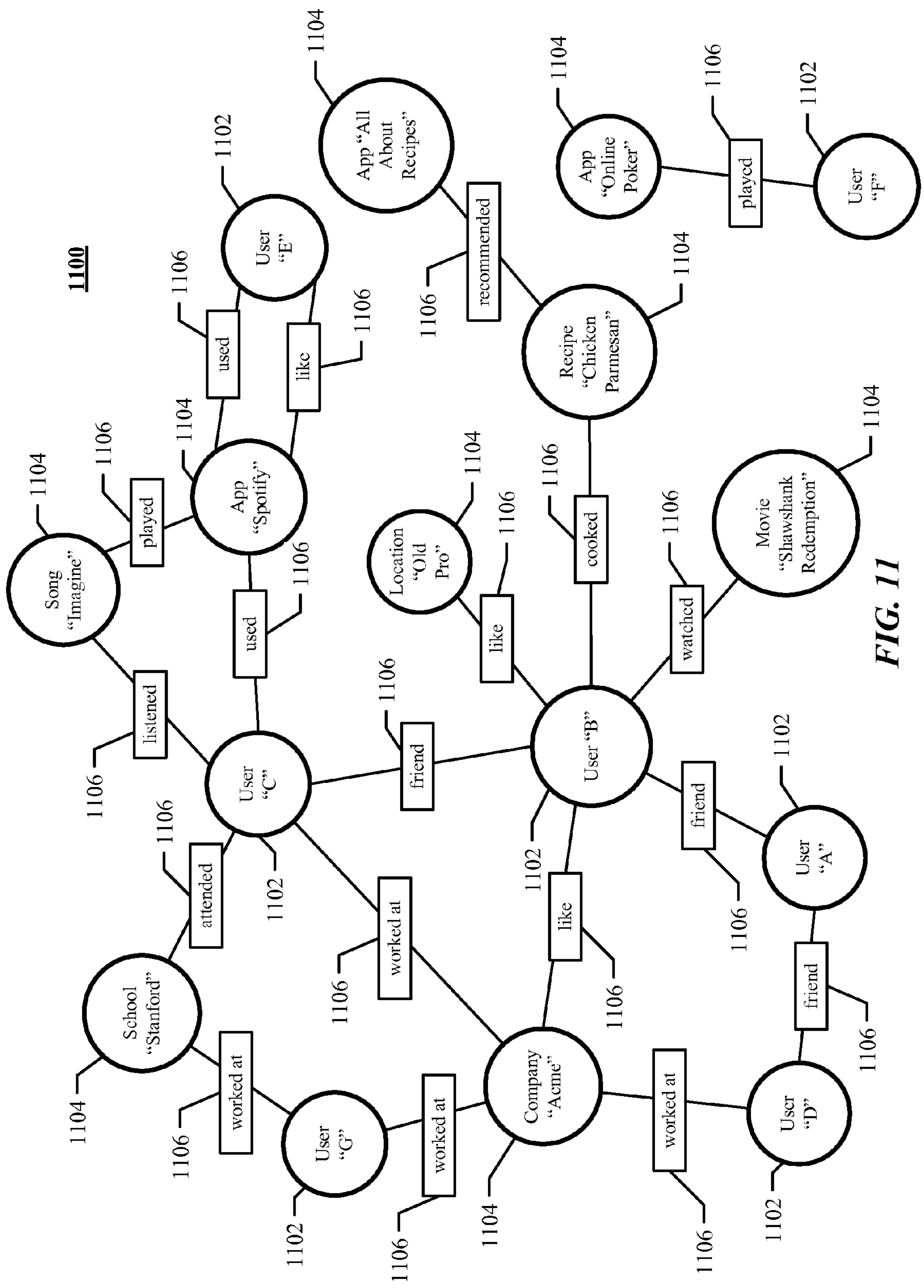
FIG. 11 illustrates an example social graph.

FIG. 11 illustrates example social graph 1100. In particular embodiments, social-networking system 1060 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social-networking system 1060, client system 1030, or third-party system 1070 may access social graph 1100 and related social-graph information for suitable applications. The nodes and edges of social graph 1100 may be stored as data objects, for example, in a data store (such as a social-graph database). Such a data store may include one or more searchable or queryable indexes of nodes or edges of social graph 1100.

In particular embodiments, a user node 1102 may correspond to a user of social-networking system 1060. As an example and not by way of limitation, a user may be an individual (human user), an entity (e.g., an enterprise, business, or third-party application), or a group (e.g., of individuals or entities) that interacts or communicates with or over social-networking system 1060. In particular embodiments, when a user registers for an account with social-networking system 1060, social-networking system 1060 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social-networking system 1060. In particular embodiments, a user node 1102 may be associated with information provided by a user or information gathered by various systems, including social-networking system 1060. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1060 or a third-party website associated with a web-application server); an entity (such as, for example, a person, business, group, sports team, or celebrity); a resource (such as, for example, an audio file, video file, digital photo, text file, structured document, or application) which may be located within social-networking system 1060 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social-networking system 1060. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social-networking system 1060. Profile pages may also be hosted on third-party websites associated with a third-party server 1070. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 1060 a message indicating the user's action. In response to the message, social-networking system 1060 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social-networking system 1060 may send a "friend request" to the second user. If the second user confirms the "friend request," social-networking system 1060 may create an edge 1106 connecting the first user's user node 1102 to the second user's user node 1102 in social graph 1100 and store edge 1106 as social-graph information. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to a edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social-networking system 1060 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1060 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social-networking system 1060 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social-networking system 1060 may create an edge 1106 between a user node 1102 and a concept node 1104 in social graph 1100. As an example and not by way of limitation, a user viewing a concept-profile page (such as, for example, by using a web browser or a special-purpose application hosted by the user's client system 1030) may indicate that he or she likes the concept represented by the concept node 1104 by clicking or selecting a "Like" icon, which may cause the user's client system 1030 to send to social-networking system 1060 a message indicating the user's liking of the concept associated with the concept-profile page. In response to the message, social-networking system 1060 may create an edge 1106 between user node 1102 associated with the user and concept node 1104, as illustrated by "like" edge 1106 between the user and concept node 1104. In particular embodiments, social-networking system 1060 may store an edge 1106 in one or more data stores. In particular embodiments, an edge 1106 may be automatically formed by social-networking system 1060 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, social-networking system 1060 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1070 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1060 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1060 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1060 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1060 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1060 may calculate a coefficient based on a user's actions. Social-networking system 1060 may monitor such actions on the online social network, on a third-party system 1070, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1060 may calculate a coefficient based on the user's actions with particular types of content. The content may be associated with the online social network, a third-party system 1070, or another suitable system. The content may include users, profile pages, posts, news stories, headlines, instant messages, chat room conversations, emails, advertisements, pictures, video, music, other suitable objects, or any combination thereof. Social-networking system 1060 may analyze a user's actions to determine whether one or more of the actions indicate an affinity for subject matter, content, other users, and so forth. As an example and not by way of limitation, if a user may make frequently posts content related to "coffee" or variants thereof, social-networking system 1060 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1060 may calculate a coefficient based on the type of relationship between particular objects. Referencing the social graph 1100, social-networking system 1060 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than a user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1060 may determine that the user has a higher coefficient with respect to the first photo than the second photo because having a tagged-in-type relationship with content may be assigned a higher weight and/or rating than having a like-type relationship with content. In particular embodiments, social-networking system 1060 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1060 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social-networking system 1060 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1030 of the user). A first user may be more interested in other users or concepts that are closer to the first user. As an example and not by way of limitation, if a user is one mile from an airport and two miles from a gas station, social-networking system 1060 may determine that the user has a higher coefficient for the airport than the gas station based on the proximity of the airport to the user.

In particular embodiments, social-networking system 1060 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1060 may provide information that is relevant to user's interests and current circumstances, increasing the likelihood that they will find such information of interest. In particular embodiments, social-networking system 1060 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1060 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1060 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1070 (e.g., via an API or other communication channel), or from another suitable system. In response to the request, social-networking system 1060 may calculate the coefficient (or access the coefficient information if it has previously been calculated and stored). In particular embodiments, social-networking system 1060 may measure an affinity with respect to a particular process. Different processes (both internal and external to the online social network) may request a coefficient for a particular object or set of objects. Social-networking system 1060 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

Figure 12:
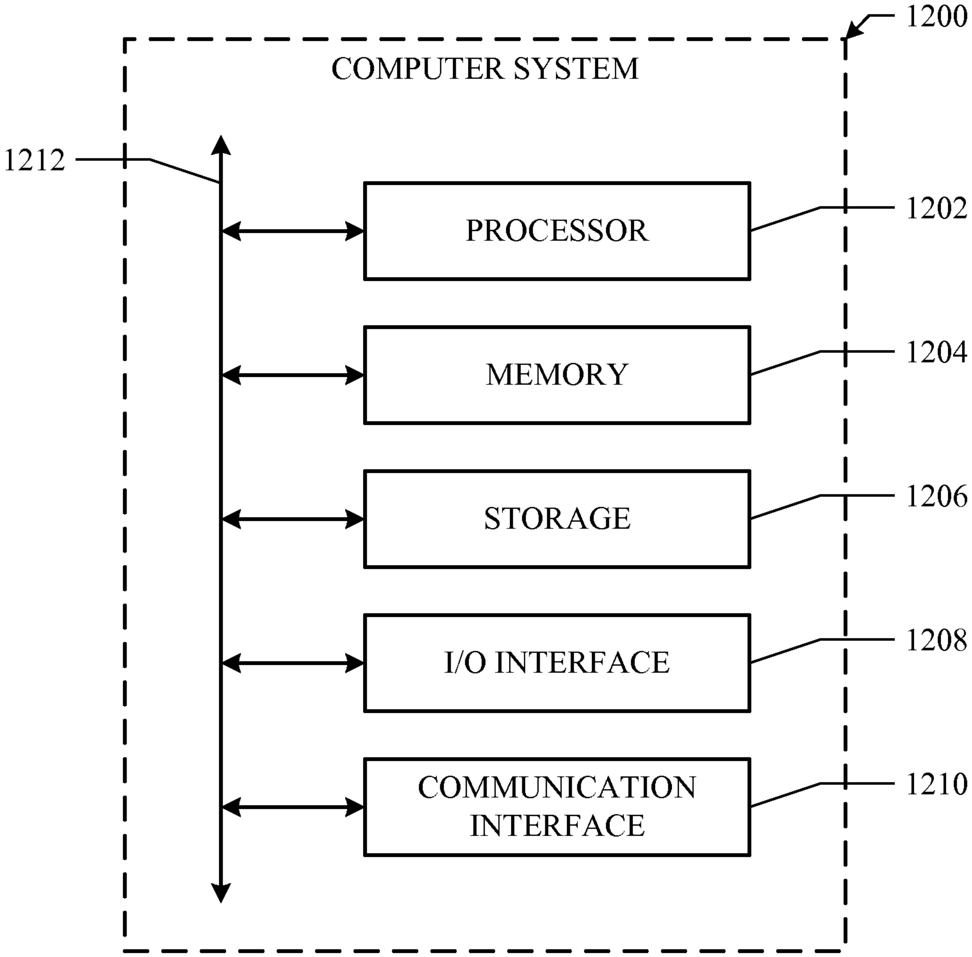
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:

by a computing device, accessing a plurality of image elements that have an ordered sequence;

by the computing device, determining a plurality of clusters of the image elements, each of the clusters comprising one or more of the image elements arranged in a line, the image elements within each cluster being scaled to have a substantially same first dimension while maintaining their original aspect ratios and being arranged to maintain the ordered sequence, and each of the clusters having a substantially same second dimension;

by the computing device, determining a cost for each of the clusters, wherein the cost for a cluster is based at least in part on a sum of costs for each image element in the cluster, the cost for a particular image element in the cluster being based at least in part on an affinity coefficient between a user node and another social-graph node in a social graph of a social-networking system, wherein the user node represents a user to whom the image elements are to be displayed, the another social-graph node is associated with a concept or another user associated with the particular image element, the affinity coefficient is based at least in part on a strength of a relationship between the user and the concept or the another user, and the affinity coefficient comprises a decay factor that causes the affinity coefficient to decrease with time;

by the computing device, accessing a graph based on the clusters that maintains the ordered sequence, the graph comprising a plurality of paths, each path representing a layout of the image elements and having a total cost based on the costs of the clusters along the path; and by the computing device, identifying a path with a lowest total cost to determine a preferred one of the layouts.

2. The method of claim 1, wherein:

the line is oriented horizontally;

the first dimension is a height of the image elements of each cluster; and the second dimension is a width of the clusters.

3. The method of claim 1, wherein:

the line is oriented vertically;

the first dimension is a width of the image elements of each cluster; and the second dimension is a height of the clusters.

4. The method of claim 1, further comprising, by the computing device, providing the image elements for display in the preferred one of the layouts.

5. The method of claim 1, further comprising, by the computing device, removing one or more clusters that do not meet certain criteria from consideration.

6. The method of claim 1, wherein:

nodes in the graph represent clusters of image elements; and edges in the graph represent line breaks between image elements.

7. The method of claim 1, wherein:

nodes in the graph represent line breaks between image elements; and edges in the graph represent clusters of image elements.

8. The method of claim 1, wherein the cost for each of the clusters is further based at least in part on a target row height.

9. The method of claim 1, wherein identifying the path with the lowest total cost comprises traversing the graph based on Dijkstra's algorithm.

10. The method of claim 1, wherein the graph is an acyclic graph.

11. The method of claim 1, wherein accessing the graph comprises constructing the graph.

12. The method of claim 1, wherein the affinity coefficient is further based at least in part on whether the user, the concept, or the another user is depicted in the particular image element.

13. The method of claim 1, wherein the affinity coefficient is further based at least in part on a degree of separation in the social graph between the user node and the another social-graph node.

14. One or more computer-readable non-transitory storage media embodying software that is operable when executed to:

access a plurality of image elements that have an ordered sequence;

determine a plurality of clusters of the image elements, each of the clusters comprising one or more of the image elements arranged in a line, the image elements within each cluster being scaled to have a substantially same first dimension while maintaining their original aspect ratios and being arranged to maintain the ordered sequence, and each of the clusters having a substantially same second dimension;

determine a cost for each of the clusters, wherein the cost for a cluster is based at least in part on a sum of costs for each image element in the cluster, the cost for a particular image element in the cluster being based at least in part on an affinity coefficient between a user node and another social-graph node in a social graph of a social-networking system, wherein the user node represents a user to whom the image elements are to be displayed, the another social-graph node is associated with a concept or another user associated with the particular image element, the affinity coefficient is based at least in part on a strength of a relationship between the user and the concept or the another user, and the affinity coefficient comprises a decay factor that causes the affinity coefficient to decrease with time;

access a graph based on the clusters that maintains the ordered sequence, the graph comprising a plurality of paths, each path representing a layout of the image elements and having a total cost based on the costs of the clusters along the path; and identify a path with a lowest total cost to determine a preferred one of the layouts.

15. The one or more computer-readable non-transitory storage claim 14, wherein:

the line is oriented horizontally;

the first dimension is a height of the image elements of each cluster; and the second dimension is a width of the clusters.

16. The one or more computer-readable non-transitory storage claim 14, wherein the software is further operable when executed to remove one or more clusters that do not meet certain criteria from consideration.

17. The one or more computer-readable non-transitory storage claim 14, wherein the cost for each of the clusters is further based at least in part on a target row height.

18. The one or more computer-readable non-transitory storage media of claim 14, wherein:

the line is oriented vertically;

the first dimension is a width of the image elements of each cluster; and the second dimension is a height of the clusters.

19. The one or more computer-readable non-transitory storage media of claim 14, wherein:

nodes in the graph represent clusters of image elements; and edges in the graph represent line breaks between image elements.

20. The one or more computer-readable non-transitory storage media of claim 14, wherein:

nodes in the graph represent line breaks between image elements; and edges in the graph represent clusters of image elements.

21. The one or more computer-readable non-transitory storage media of claim 14, wherein identifying the path with the lowest total cost comprises traversing the graph based on Dijkstra's algorithm.

22. The one or more computer-readable non-transitory storage media of claim 14, wherein the affinity coefficient is further based at least in part on whether the user, the concept, or the another user is depicted in the particular image element.

23. The one or more computer-readable non-transitory storage media of claim 14, wherein the affinity coefficient is further based at least in part on a degree of separation in the social graph between the user node and the another social-graph node.

24. A system comprising:

one or more processors; and a memory coupled to the processors comprising instructions executable by the processors, the processors being operable when executing the instructions to:

access a plurality of image elements that have an ordered sequence;

determine a plurality of clusters of the image elements, each of the clusters comprising one or more of the image elements arranged in a line, the image elements within each cluster being scaled to have a substantially same first dimension while maintaining their original aspect ratios and being arranged to maintain the ordered sequence, and each of the clusters having a substantially same second dimension;

determine a cost for each of the clusters, wherein the cost for a cluster is based at least in part on a sum of costs for each image element in the cluster, the cost for a particular image element in the cluster being based at least in part on an affinity coefficient between a user node and another social-graph node in a social graph of a social-networking system, wherein the user node represents a user to whom the image elements are to be displayed, the another social-graph node is associated with a concept or another user associated with the particular image element, the affinity coefficient is based at least in part on a strength of a relationship between the user and the concept or the another user, and the affinity coefficient comprises a decay factor that causes the affinity coefficient to decrease with time;

access a graph based on the clusters that maintains the ordered sequence, the graph comprising a plurality of paths, each path representing a layout of the image elements and having a total cost based on the costs of the clusters along the path; and identify a path with a lowest total cost to determine a preferred one of the layouts.

25. The system of claim 24, wherein the processors are further operable when executing the instructions to provide the image elements for display in the preferred one of the layouts.

26. The system of claim 24, wherein identifying the path with the lowest total cost comprises traversing the graph based on Dijkstra's algorithm.

27. The system of claim 24, wherein:

the line is oriented horizontally;

the first dimension is a height of the image elements of each cluster; and the second dimension is a width of the clusters.

28. The system of claim 24, wherein:

the line is oriented vertically;

the first dimension is a width of the image elements of each cluster; and the second dimension is a height of the clusters.

29. The system of claim 24, wherein:

nodes in the graph represent clusters of image elements; and edges in the graph represent line breaks between image elements.

30. The system of claim 24, wherein:

nodes in the graph represent line breaks between image elements; and edges in the graph represent clusters of image elements.

31. The system of claim 24, wherein the cost for each of the clusters is further based at least in part on a target row height.

32. The system of claim 24, wherein the affinity coefficient is further based at least in part on whether the user, the concept, or the another user is depicted in the particular image element.

33. The system of claim 24, wherein the affinity coefficient is further based at least in part on a degree of separation in the social graph between the user node and the another social-graph node.

* * * * *